United States Patent
Smith et al.

(10) Patent No.: US 7,179,072 B2
(45) Date of Patent: Feb. 20, 2007

(54) GAS VENTING NEEDLE

(76) Inventors: Gordon Frederick Smith, 31 Myton Crescent, Warwick, CV34 6QA (GB); David George Head, Heathpoint, Warren Upper Ave., Caversham Heights, Reading, RG4 7ED (GB); Helmut Echardt, c/o Battenfeld GmbH, P.O. Box 1164/65, D-58527 Meinerzhagen (DE)

(*) Notice: Subject to any disclaimer, the term of this patent is extended or adjusted under 35 U.S.C. 154(b) by 52 days.

(21) Appl. No.: 10/843,881

(22) Filed: May 12, 2004

(65) Prior Publication Data
US 2005/0079239 A1    Apr. 14, 2005

(51) Int. Cl.
  B28B 13/00    (2006.01)
(52) U.S. Cl. ................... 425/130; 264/572
(58) Field of Classification Search ............ 425/130; 264/572
  See application file for complete search history.

(56) References Cited

U.S. PATENT DOCUMENTS

| | | | |
|---|---|---|---|
| 6,250,903 B1 * | 6/2001 | Fernandez et al. | ......... 425/130 |
| 6,354,826 B1 * | 3/2002 | Thomas | ............. 425/130 |

FOREIGN PATENT DOCUMENTS

| | | |
|---|---|---|
| EP | 0485726 | 5/1992 |
| EP | 0763414 | 3/1997 |
| GB | 1549940 | 9/1979 |
| JP | 63004956 | 11/1994 |
| JP | 07068598 | 3/1995 |
| JP | 7068598 | 3/1995 |
| JP | 07100853 | 4/1995 |
| JP | 7100853 | 4/1995 |
| JP | 08057862 | 3/1996 |
| JP | 11090954 | 4/1999 |
| US | 5939103 | 8/1999 |
| US | 6120275 | 9/2000 |
| WO | WO 98/00278 | 1/1998 |
| WO | WO 99/07536 | 2/1999 |
| WO | WO 99/47333 | 9/1999 |

* cited by examiner

*Primary Examiner*—Joseph S. Del Sole
*Assistant Examiner*—Maria Veronica D. Ewald
(74) *Attorney, Agent, or Firm*—Wood, Philips, Katz, Clark & Mortimer

(57) ABSTRACT

A gas venting needle for use in gas injection moulding the open end having a flow valve with no moving parts; the flow valve being provided by a plurality of individual flow channels sized such that in use gas may freely flow through these channels but liquid moulding material may not freely flow through.

9 Claims, 6 Drawing Sheets

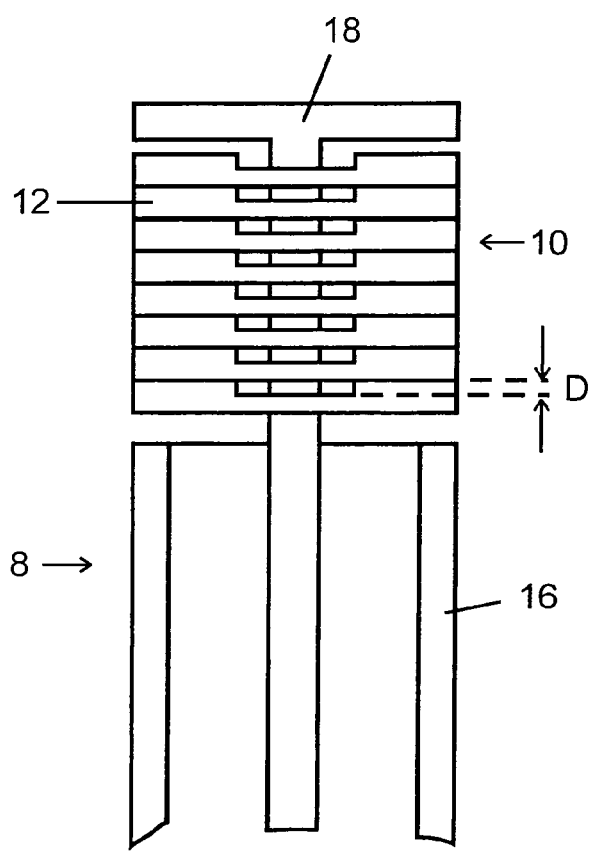
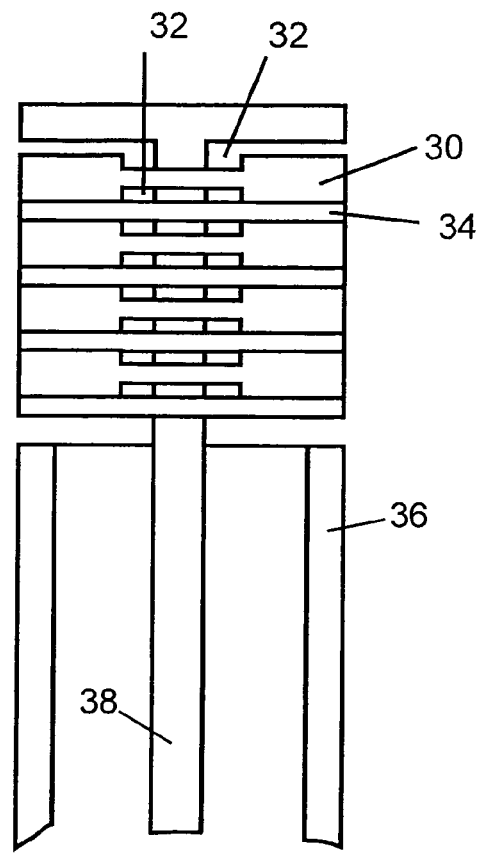
Fig 1
Fig 3
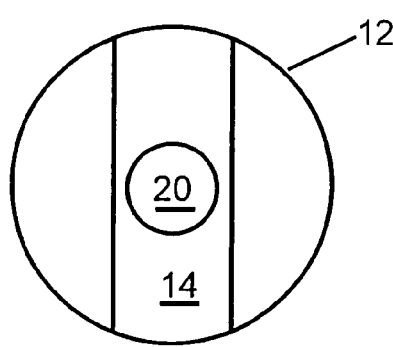
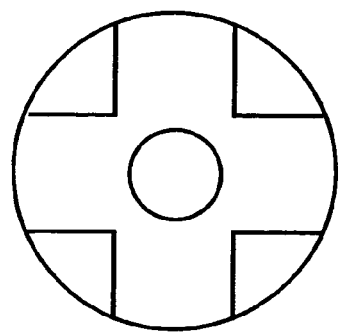
Fig 2
Fig 4

GAS VENTING NEEDLE

BACKGROUND OF INVENTION

1. Field of the Invention

This invention relates to a gas injection moulding needle and in particular to a valve arrangement for such a needle.

2. Background of the Invention

Gas injection moulding is a well established process. Needles are employed to inject and to vent gas used during the moulding cycle. The majority of needles operate with valve systems that rely on moving members; if high flow is to be achieved. Such valves allow rapid ingress and exhaust of gas to the mould. However such needles suffer the disadvantage that polymer may block the open end of needles and also feed back down the needle. This can also lead to blockage and/or accelerated wear of needle assemblies; in particular wear of spring and piston members.

SUMMARY OF INVENTION

An object of the present invention is to provide an alternative needle that allows gas to pass to and from an injection moulding cavity, but will prevent polymer from forcing its way back down the needle. Further objects of the invention are to provide a simpler "high flow" needle with no moving parts, having longer life and being less prone to blockage by solidified polymer.

According to one aspect the invention provides a needle for use in gas injection moulding comprising at least one flow channels sized such that in use gas may freely flow through the channel but liquid moulding material may not freely flow therethrough.

According to another aspect the invention provides a needle for use in injection moulding comprising an open end which has a flow valve with no moving parts comprising a plurality of individual flow channels sized such that in use gas may freely flow through these channels but liquid moulding material may not freely flow therethrough.

The plurality of individual flow channels may be provided by one or more members such as washers. The flow channel may be formed on one face or both faces of the washer. A plurality of channels may be provided on or within the member or washer. Preferably, washers are arranged in the form of a stack and held in place by a bolt or the like that passes through a hole in the washer. The washer is frequently circular in outline; however, other shapes may be employed. The flow channel may have a depth of less than 0.1 mm and preferably a depth of between 0.01 and 0.1 mm.

The flow channel may also be provided by a helical member formed by spirally winding a strip of material on a former. Spacer elements are provided between each turn of the material so as to form elongate flow channels. While the former used to produce the spiral is preferably generally circular in cross section other shaped formers may be used; for example, a generally square shaped former may be used to produce a "spiral" that has four sides to each turn and is suitable for inserting within a needle that has a generally square shaped inner channel. The spacer elements may be provided by strips attached to one surface of sheet material prior to rolling on a former. Preferably, the spacer strips are generally parallel and they provide a gap of up to 0.1 mm and typically a gap of 0.01 to 0.1 mm between each turn of the spiral. Strips may also be formed integrally within the sheet material by providing channels (typically 0.03 mm deep); preferably parallel elongate channels formed by grinding or other known means. Thus the strips so formed are those areas of the sheet material without such channels. Preferably the strips are inclined at an angle to the longitudinal axis of the strip; this offers the advantage of helping to avoid collapse of the strip as it is wound. Preferably, the angle of inclination is in the range 10° to 60° and preferably approximately 20°. A series of concentric rings with annular flow channels therebetween may be used instead of the spiral coil arrangement described above. Less preferably, the flow restrictor may comprise a matrix of channels having a polygonal cross section formed by sets of parallel sheets or wires each set being inclined at an acute angle to the other set. Preferably, the spacers are formed on the surface of a metal spiral by the electro-discharge machining method or chemical etching or mechanical grinding/pressing.

BRIEF DESCRIPTION OF DRAWINGS

The invention will be described by reference to the following diagramatic figures in which:

FIG. 1 shows a sectioned side view of the open end of a needle with a flow restrictor (not sectioned) according to the invention in a partly disassembled state;

FIG. 2 shows a plan view of one of the washers shown in FIG. 1;

FIG. 3 shows a sectioned side view of the open end of a needle with a flow restrictor (not sectioned) according to another embodiment of the invention;

FIG. 4 shows a plan view of a washer according to another embodiment of the invention;

DETAILED DESCRIPTION OF INVENTION

Figure 5:
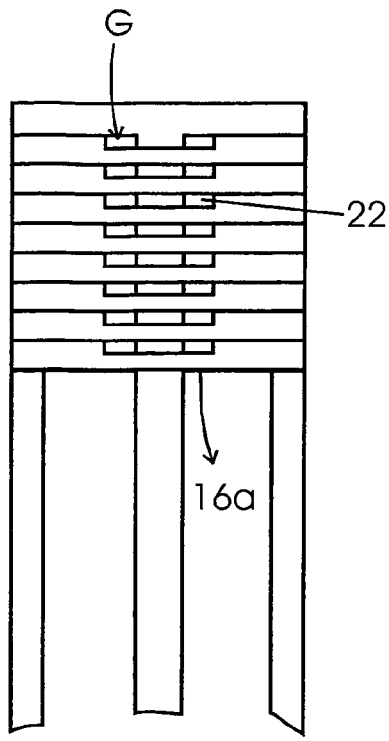
FIG. 5 shows a view corresponding to FIG. 1 with the needle in an assembled state.

FIGS. 1, 2 and 5 show a first embodiment of the invention in partly disassembled form that employs washers to provide the plurality of individual flow channels. The needle 8 comprises a stack 10 of washers 12. Each washer 12 has a slot or channel 14 that extends diametrically across a face of the washer part way therethrough. The depth D of the slot is normally less than 0.1 mm and preferably in the range 0.01 to 0.05 mm.; typically approximately 0.03 mm. A stack of washers is retained at the open end of a needle 16 by means of a bolt 18 or the like. The washer has a hole 20 that is of larger area than the cross sectional area of bolt 18; preferably this hole is circular and the open annulus formed between the bolt 18 and the walls of hole 20 provides a channel that allows gas to flow in or out of the needle. FIG. 5 shows the embodiment of FIG. 1 in assembled form. Thus, in use gas G may flow into the needle, from a void within the mould formed during moulding, by first entering the rectangular apertures 22 and then flowing through the annular channel formed between hole 20 and bolt 18 into the end 16a of the needle 16. Surprisingly, while apertures 22 allow free flow of gas they do not allow flow of molten thermoplastic material of the type commonly used in gas assisted injection moulding processes.

FIG. 3 shows another aspect of the embodiment using stacked washers. In this case there are several washers 30 each with a slots or channels; however in this case there is a slot 32 on each face; again the slots pass only part way through the washer. In this arrangement washers 30 are interleaved between standard washers 34 which have no such slot or channel but merely a central aperture the same size as the aperture in washer 30. Again, a stack of such washers is held in place at the end of needle 36 by a bolt 38 and the washer 30 has a central circular hole sized to leave an annular flow-channel around bolt 38.

FIG. 4 shows another form of washer having slots. In this case there is a first (North-South) slot and a second (East-West) slot. Thus the number and location of slots may vary according to the size of the washer and other factors. In addition, such a configuration of slots can be used with both the single sided slot washer 12 and the twin sided slot washer 30. It should be noted that while the washer will frequently be circular in outline that other shapes are possible such as square, rectangular, polygonal etc., in which case the hole 20 need not be centrally located.

Figure 7:
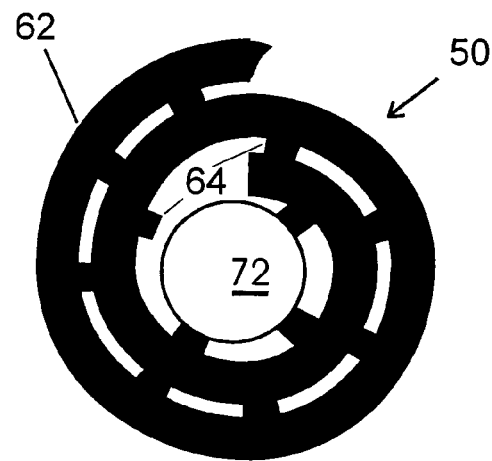
FIG. 7 shows an end view of part of the spiral flow restrictor shown in FIG. 6.
Figure 6:
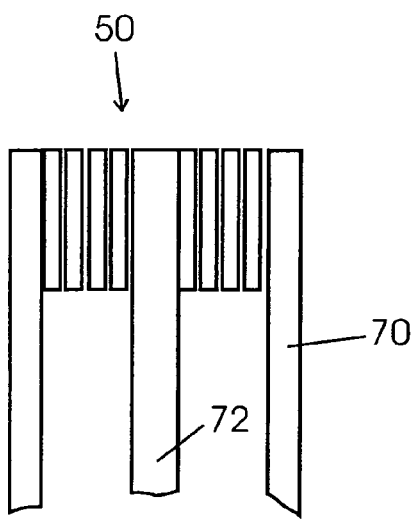
FIG. 6 is a side view of the open end of a needle with a spiral low restrictor according to a second embodiment of the invention.
Figure 8:
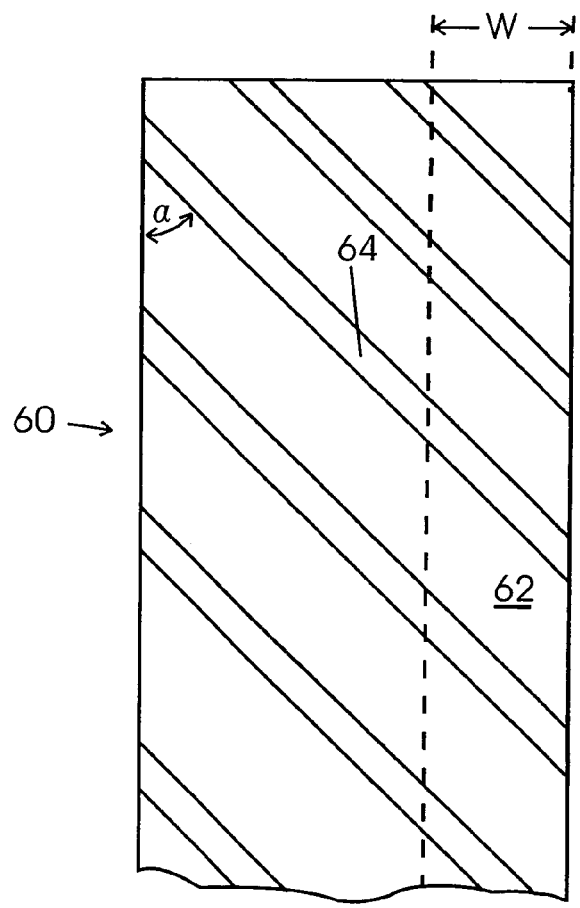
FIG. 8 shows sheet material used to form the spiral flow restrictor of FIG. 6.

FIGS. 6 and 7 show a second embodiment of the invention which employs a spiral member 50 to provide the plurality of individual flow channels. Spiral member 50 may be formed (see FIG. 8) from sheet material 60 cut to appropriate width W to form material strip 62; the strip 62 then being coiled around a former; for example, in the same way that a watch spring is formed. Flow channels are ensured by providing spacer elements. This may conveniently be provided by forming a series of parallel spacer strips 64 on the sheet material. The spacer strips 64 may be formed on the sheet material by the electro-discharge machining method. The parallel strips 64 are inclined at an angle a of about 45° to the longitudinal axis of the strip of material 62. FIG. 7 shows an end view of part of the spiral 50 showing how spacer strips 64 of generally rectangular cross section provide a plurality of arcuate slots 66 that present flow channels of the required dimension. The spacers 64 are normally less than 0.1 mm. thickness and preferably in the range 0.01 to 0.05 mm. thickness; typically about 0.03 mm. thickness. Spiral member 50 is held in place at the open end of a needle 70 by means of a retaining rod 72. Rod 72 may also be used as the former upon which strip 62 is wound in the manufacture of the spiral.

Figure 9:
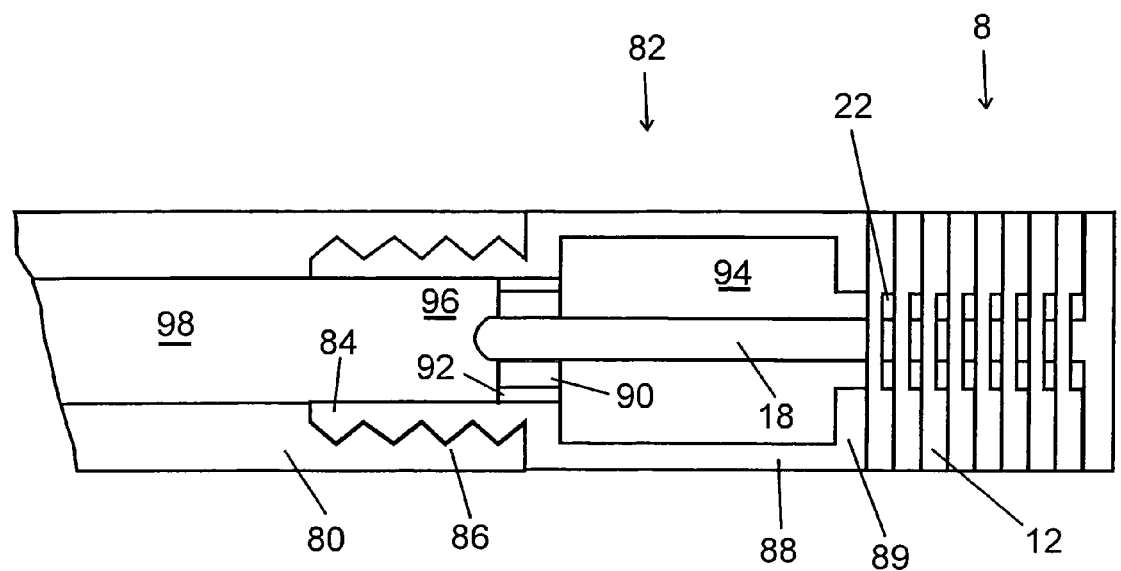
FIG. 9 shows one arrangement for attaching the flow restrictor of FIGS. 1 to 5 to the main needle tube.
Figure 10:
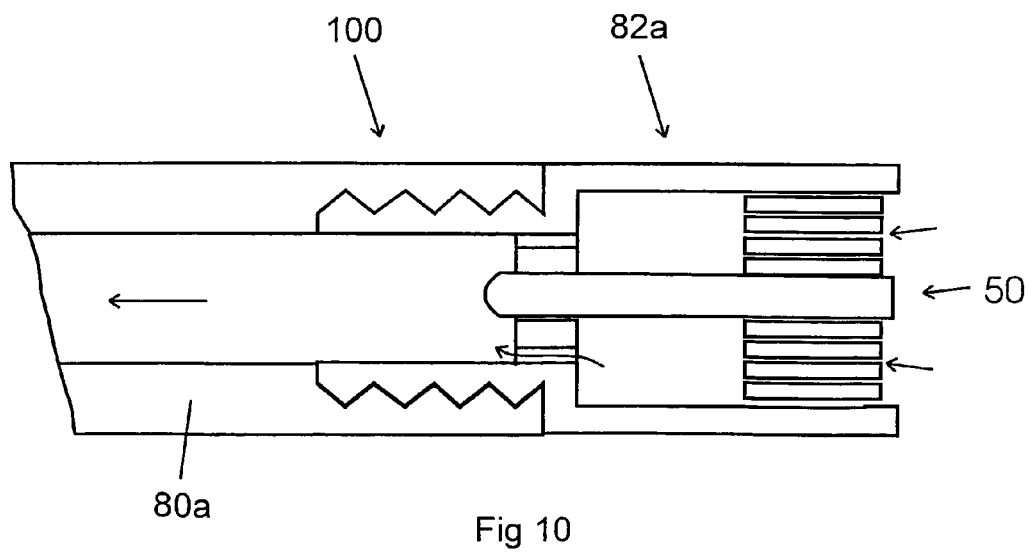
FIG. 10 shows one arrangement for attaching the flow restrictor of FIGS. 6 and 7 to the main needle tube.

FIGS. 9 and 10 illustrate one arrangement for securing the flow restrictors described above to a main needle tube. FIG. 9 shows the flow restrictor 8 of FIGS. 1 and 2 comprising washers 12 and bolt 18 secured to the main needle tube 80 by means of connector 82. Connector 82 comprises a first section 84 with a tapered thread 86 that engages a corresponding thread in the end of main needle tube 80. A second tubular section 88 of the connector 82 is integrally formed therewith and has an external diameter the same as that of the main needle 80 and a flange 89 at that end adjacent to washers 12. At the junction of the first section 86 and the second section 88 is a engaging end wall 90 integrally formed with the rest of the connector. Wall 90 has a plurality of tubular flow channels 92 and a threaded bore (not shown), sized to engage a thread (not shown) on the end of bolt 18. Thus, in use gas can be vented from a void by entering apertures 22, flowing into the inner chamber 94 of the second section 88, flowing through one of the channels 90 into the inner tubular section 96 of first section 84 and then down the inner tube 98 of main needle 80.

The connector 100 shown in FIG. 10 is very similar to connector 82 described above. It is used to connect the spiral flow restrictor 50, shown in FIGS. 6 and 7 to a main needle tube 80a. It differs from that connector in that there is no flange 89 as provided on connector 82 described above; this allows spiral 50 to be inserted within the open end of second portion 82a and then held in place by adhesive or the like.

Other means of connecting the flow restrictor described above to the main body of a needle, readily apparent to a person skilled in the art may also be employed.

Figure 11:
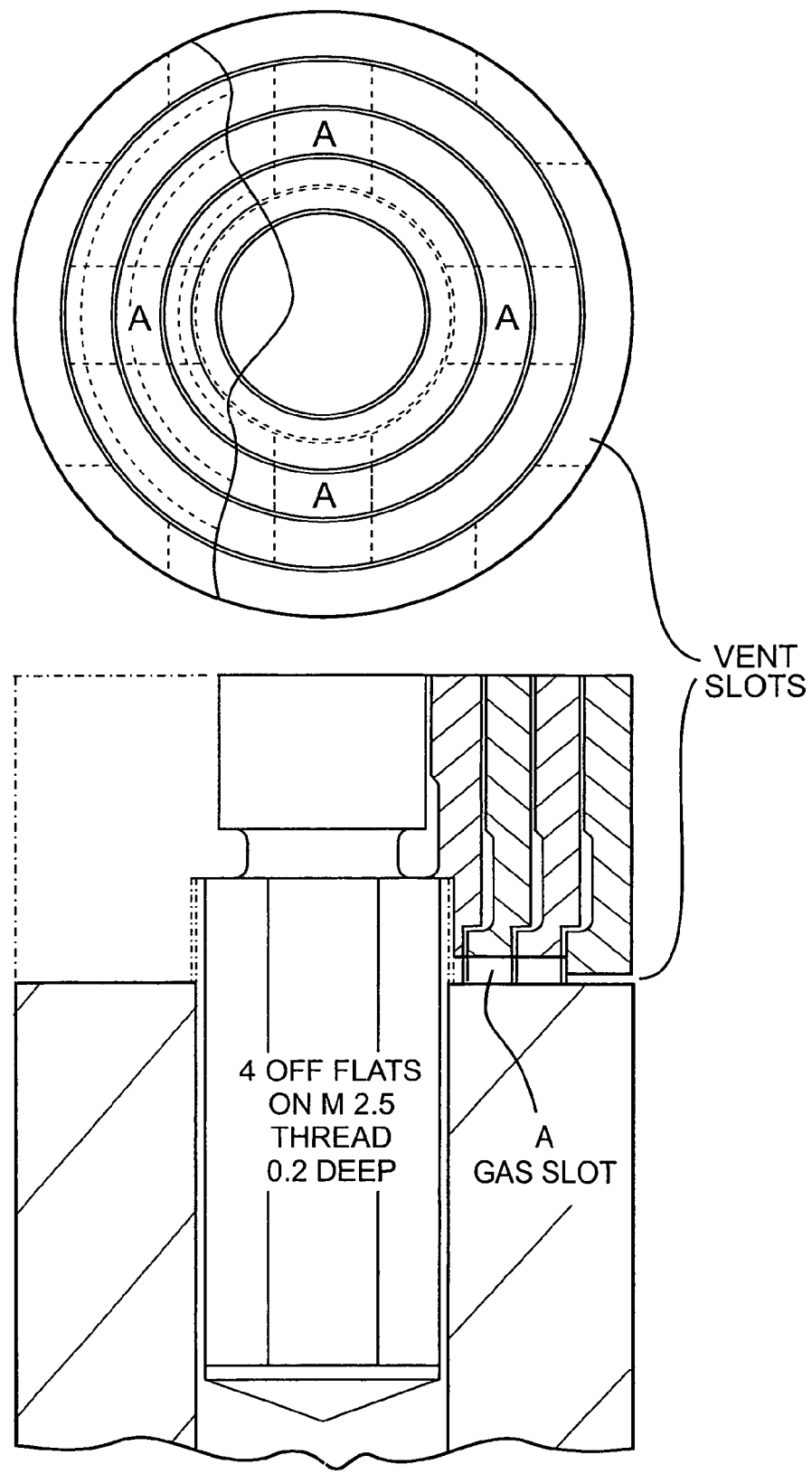
FIG. 11 shows side and end sectioned views of a third embodiment of the invention.

FIG. 11 shows a further embodiment of the invention, similar to the spiral flow restrictor 50 described above. This flow restrictor uses four concentric rings instead of a spiral. These rings are precision machined to provide annular flow channels therebetween. The nubmer of concentric rings may be varied according to the gas flow rate to be vented.

Figure 12:
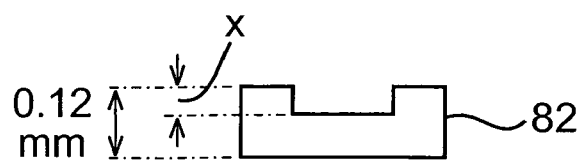
FIGS. 12 to 14 shows a side view, plan view and perspective view respectively of flow restrictor for a fourth embodiment of the invention.
Figure 14:
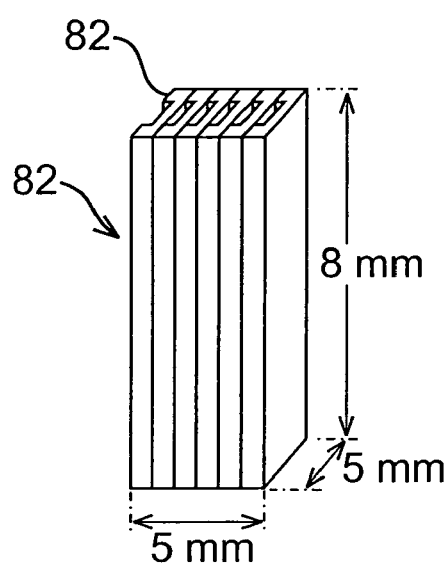
Figure 13:
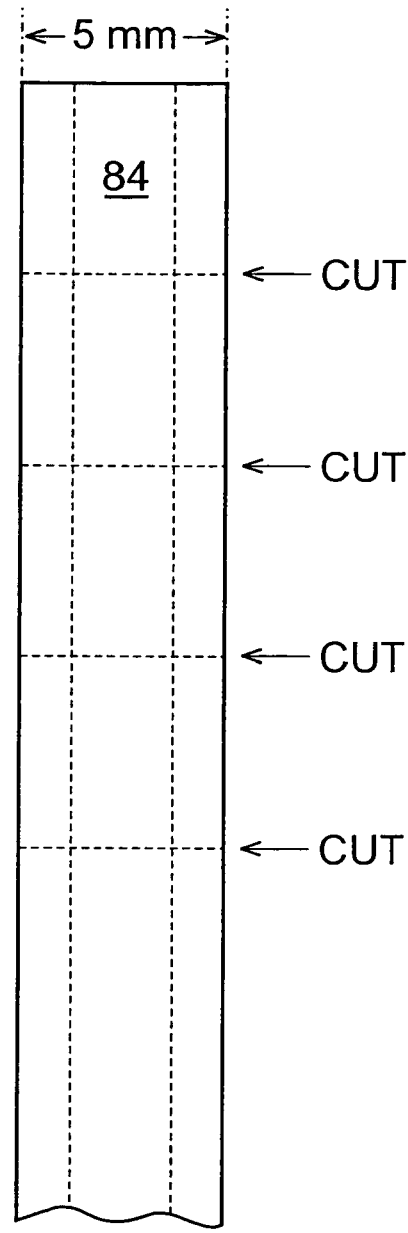

FIG. 14 shows a further embodiment of the invention in which the flow restrictor 80 comprises a stack of sheet members 82; each sheet member having a generally "U-shaped cross section (see FIG. 12). Individual sheet members 82 may be produced by cutting a single long sheet 84 (see FIG. 13).

Figure 15:
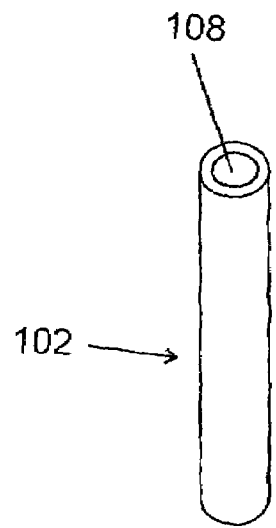
FIGS. 15 to 17 show perspective views of flow restrictors for a fifth embodiment of the invention, comprising a single needle, a group of needles and said group of needles in a holder respectively.
Figure 16:
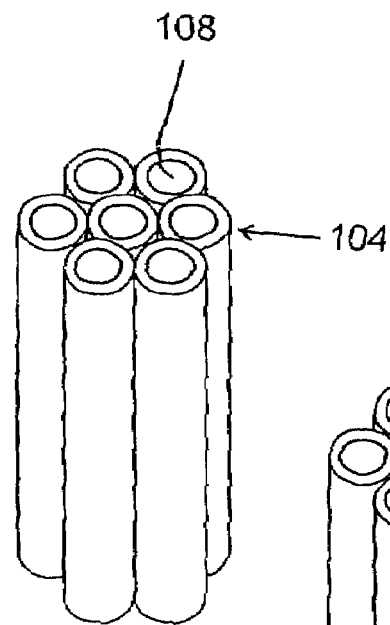
Figure 17:
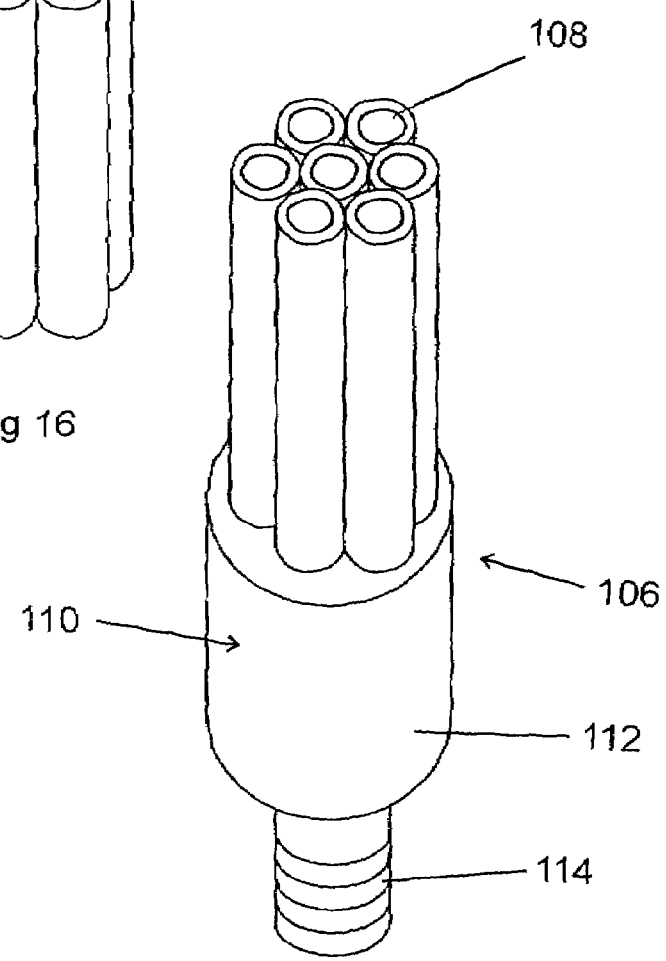

FIGS. 15 to 17 show a further embodiment of the invention in which the flow restrictors 102, 104 and 106 comprises one or more flow channels the internal diameter of each flow channel being less than 0.1 mm, preferably in the range 0.01 to 0.1 mm and more preferably in the range 0.01 to 0.05 mm; such that gas may freely flow through these channels but liquid moulding material may not freely flow therethrough. Preferably, each flow channel 108 is tubular, and preferably of circular cross section. Preferably, each flow channel is elongate and the axes of individual flow channels are substantially parallel to one another. The flow channels may have a non-circular cross section; for example square, rectangular, hexagonal, octagonal etc. where there are a plurality of flow channels they may have substantially similar cross sections or they may have varying shape and/or variously sized cross sections. If the channels do not have a circular cross section the depth of the channel is preferably less than 0.1 mm, preferably in the range 0.01 to 0.1 mm, and more preferably in the range 0.01 to 0.05 mm. The flow channel or channels will normally receive gas via a holder 110 which comprises a main body 112, connector 114 and an internal manifold (not shown) that allows gas entering via the connector 114 to flow within the main body 112 and up through individual flow channels 108. The main body 112 also has means that allow the individual flow channels 108 to be securely fixed thereto.

In use, gas flows through the flow channels at high pressure; typically at up to 50 to 300 bar. In the first embodiment the number of washers that are stacked will determine the flow obtained for a given pressure differential between the needle and the moulding material void. The second embodiment of the invention is particularly useful when the number of washers required to produce the required flow exceeds the allowable height of the tool cavity. This is most likely to be the case where relatively high gas venting rates are desired.

We claim:

1. A needle for use in gas injection moulding comprising: a plurality of individual flow channels with open ends providing a flow valve with no required moving parts; the flow channels configured such that in use gas may freely flow through the flow channels but liquid moulding material may not freely flow therethrough; wherein the plurality of individual flow channels are provided by a strip of material spirally wound; wherein spacer elements are provided between adjacent turns of the spirally wound material.

2. A needle according to claim 1 wherein the strip of material is spirally wound on a retaining rod.

3. A needle according to claim 1 wherein the spacer elements provide a gap of between 0.01 and 0.1 mm between adjacent turns of the spirally wound material.

4. A needle according to claim 1 wherein the spacer elements provide a gap of between 0.01 and 0.05 mm between adjacent turns of the spirally wound material.

5. A needle according to claim 1 wherein the spacer elements comprise a series of parallel strips inclined at an angle $\alpha$ to the edge of the strip of material where $\alpha$ is in the range of 10° to 60°.

6. A needle according to claim 1 wherein the spacer elements are formed within the strip of material by an electro-discharge machining method.

7. A needle according to claim 1 wherein the spacer elements have a generally rectangular cross section.

8. A needle according to claim 1 wherein there is a spacer element provided between each of the adjacent turns of spirally wound material.

9. A needle according to claim 8 wherein a gap between all adjacent turns is substantially uniform in dimension.

* * * * *